United States Patent
Balsdon

(10) Patent No.: US 6,722,626 B2
(45) Date of Patent: Apr. 20, 2004

(54) VALVE PROVIDING INCREASE IN FLOW FOR INCREASE IN POWER LEVEL

(75) Inventor: David W. Balsdon, Chatham (CA)

(73) Assignee: Siemens Automotive Inc. (CA)

( * ) Notice: Subject to any disclaimer, the term of this patent is extended or adjusted under 35 U.S.C. 154(b) by 88 days.

(21) Appl. No.: 09/928,475

(22) Filed: Aug. 14, 2001

(65) Prior Publication Data

US 2002/0020399 A1 Feb. 21, 2002

Related U.S. Application Data

(60) Provisional application No. 60/225,069, filed on Aug. 14, 2000.

(51) Int. Cl.[7] ............................................. F16K 31/02
(52) U.S. Cl. ................................. 251/129.05; 123/520
(58) Field of Search ..................... 123/520; 251/129.05, 251/129.15

(56) References Cited

U.S. PATENT DOCUMENTS

| | | | | |
|---|---|---|---|---|
| 4,530,486 A | * | 7/1985 | Rusnak | 251/129.17 |
| 4,901,974 A | * | 2/1990 | Cook et al. | 251/129.15 |
| 5,560,585 A | * | 10/1996 | Krimmer et al. | 251/129.21 |
| 5,649,687 A | * | 7/1997 | Rosas et al. | 251/129.15 |
| 6,019,347 A | * | 2/2000 | Adams et al. | 251/129.21 |
| 6,347,616 B1 | * | 2/2002 | Rodriguez et al. | 123/520 |

* cited by examiner

*Primary Examiner*—Gene Mancene
*Assistant Examiner*—Melvin A. Cartagena

(57) ABSTRACT

A canister purge valve increases flow through the valve for an increased power level. The canister purge valve includes a housing that defines a volume and has an inlet and an outlet in fluid communication with the volume. A coil is disposed in the volume proximate the outlet. A stator is disposed in the volume proximate the outlet, the stator having a first surface. An armature is disposed in the coil, the armature having a second surface proximate the first surface of the stator and defining a gap therebetween. The armature is movable to an open position permitting fluid flow through the volume in response to an energization of the coil. A biasing member is disposed between the stator and the armature, the biasing member urging the armature to a closed position prohibiting fluid flow through the volume. An elastomeric contact member is disposed in the gap, the member maintaining continuous contact with the first and second surfaces during an entire movement of the armature between the open and closed positions.

21 Claims, 4 Drawing Sheets

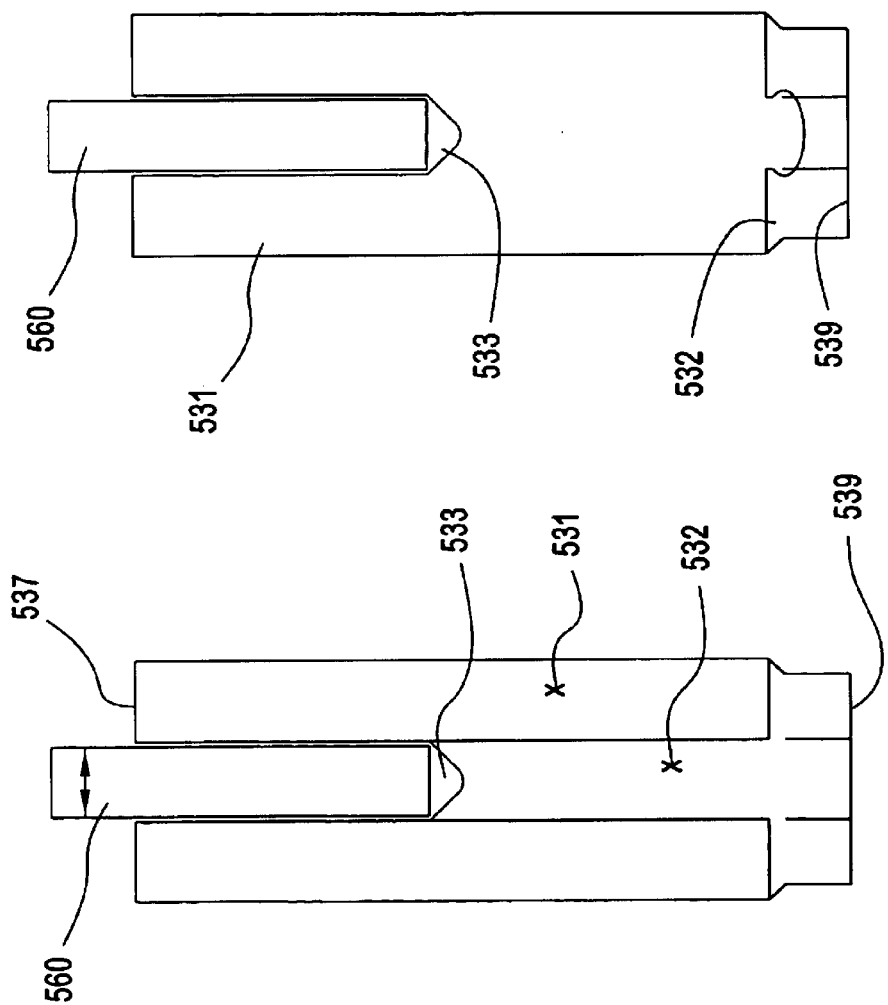

VALVE PROVIDING INCREASE IN FLOW FOR INCREASE IN POWER LEVEL

CLAIM FOR PRIORITY

This application claims the benefit of the earlier filing dates of U.S. and Provisional Applications No. 60/225,069 (entitled "Armature Design for a Canister Purge Solenoid", filed Aug. 14, 2000), which is hereby incorporated by reference in its entirety.

FIELD OF THE INVENTION

The invention relates to a canister purge valve, and more particularly to a canister purge valve providing an increase in a flow rate through the valve for an increase in power level to a coil and/or an increase in duty cycle.

BACKGROUND OF THE INVENTION

It is known to use an armature in a canister purge valve to permit and prohibit flow through the housing of a canister purge valve. A known canister purge valve has a spring disposed between a stator and the armature. The spring biases the armature towards a seat to prohibit flow through the valve housing. Energization of an electromagnetic coil magnetically attracts the armature in a direction that is toward the stator and away from the seat (i.e., in a direction that opposes the bias of the spring), thereby permitting flow through the housing of the valve.

In the known valve, an air gap exists between the stator and the armature. It is believed that the interaction among the air gap, spring, and coil that actuates the armature and the stator can cause a fluid flow rate through the valve to drop for an increase in duty cycle and/or increase in power to the coil, and can cause a fluid flow rate through the valve to increase non-linearly for an increase in duty cycle and/or increase in power to the coil. Thus, it is believed to be desirable to provide a valve that increases a flow rate through the valve for an increase in power level to a coil.

SUMMARY OF THE INVENTION

The invention provides a canister purge valve that increases flow through the valve for an increase in power level. The canister purge valve includes a housing that defines a volume and has an inlet and an outlet in fluid communication with the volume. A coil is disposed in the volume proximate the outlet. A stator is disposed in the volume proximate the outlet, the stator having a first surface. An armature is disposed in the coil, the armature having a second surface proximate the first surface of the stator and defining a gap therebetween. The armature is movable to an open position permitting fluid flow through the volume in response to an energization of the coil. A biasing member is disposed between the stator and the armature, the biasing member urging the armature to a closed position prohibiting fluid flow through the volume. An elastomeric contact member is disposed in the gap, the member maintaining continuous contact with the first and second surfaces during an entire movement of the armature between the open and closed positions.

The invention also provides a method of maintaining an increase in flow rate for an increase in duty cycle in a system having a housing defining a volume, the system having a coil, a stator, and an armature disposed in the volume. The method can be achieved by energizing the coil to attract the armature towards the stator, and maintaining continuous contacting between the armature and the stator with a compressible member during energization and deenergization of the coil.

The invention also provides a method of maintaining an increase in flow rate through a valve defining a void, the valve including a coil, a stator, and an armature disposed in the void. The method can be achieved by energizing the coil to attract the armature towards the stator and permit flow through the valve, and disposing a compressible member between the armature and the stator, the member deforming during movement of the armature and providing an increase in a flow rate through the valve.

BRIEF DESCRIPTIONS OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 2 shows a cross-sectional view of an embodiment of an armature.

FIG. 3 shows a cross-sectional view of another embodiment of an armature.

DETAILED DESCRIPTION OF THE PREFERRED EMBODIMENT

Figure 1:
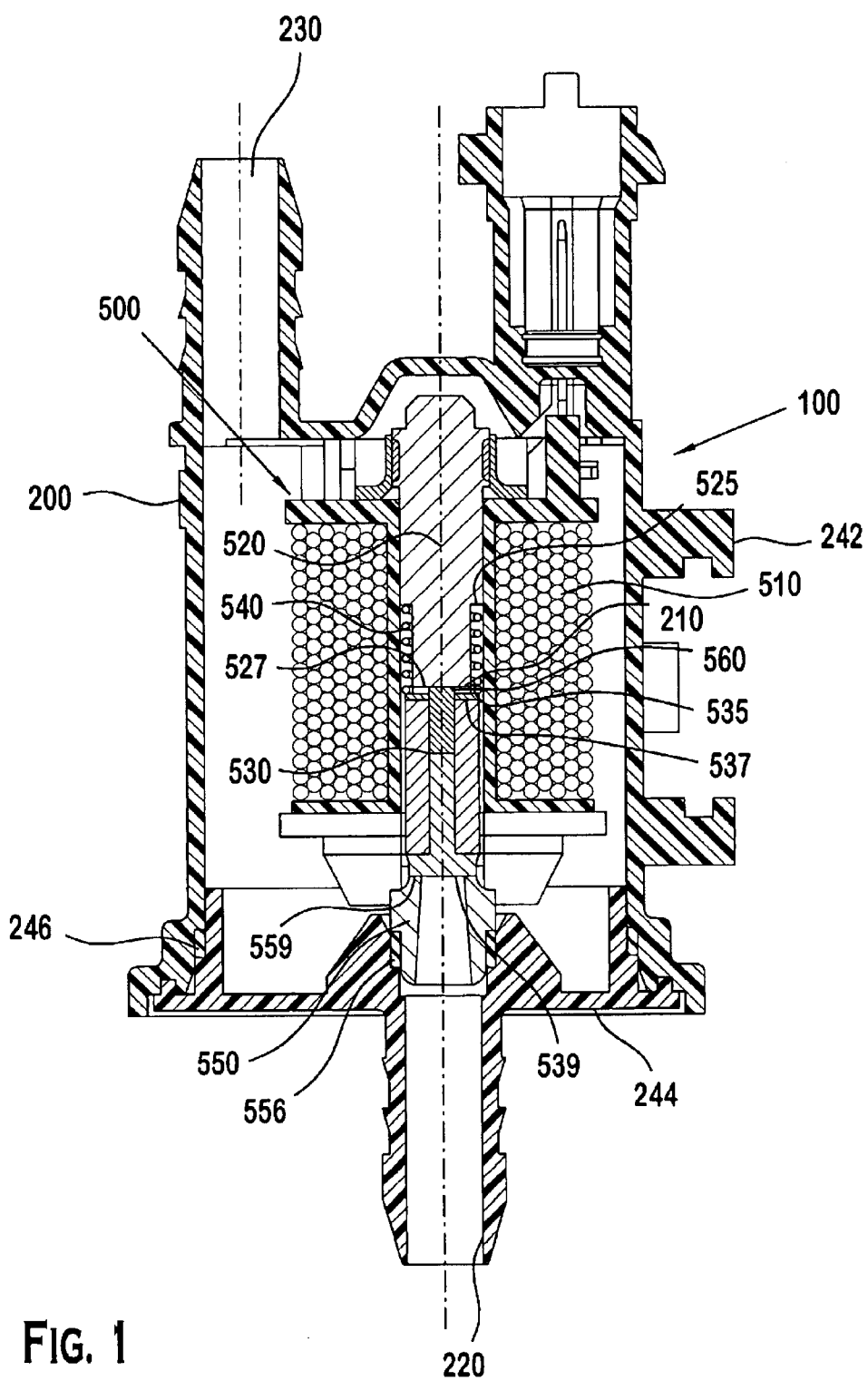
FIG. 1 shows a cross-sectional view of a canister purge valve including a contact member.

FIG. 1 show an example of a canister purge valve 100 that provides an increase in flow through the valve 100 for an increase in power level to a coil and/or an increase in duty cycle. The canister purge valve 100 includes a housing 200 defining a void or volume 210, and having an inlet 220 and an outlet 230. The volume 210 is in fluid communication with the inlet 220 and the outlet 230. Preferably, as shown in the figure, the housing 200 includes an upper housing 242, a lower housing 244, and a housing seal 246 disposed therebetween. A connection can be made between the upper and lower housings 242, 244. The connection can be a weld, and preferably is a sonic weld. However, the housing 200 can be an integral structure.

The electromagnetic actuator valve assembly 500 is disposed in the volume 210 to permit fluid flow through the valve 100 when in an open position and to prohibit fluid flow through the valve 100 when in a closed position. The actuator valve 500 includes electromagnetic coil 510, stator 520, armature 530, biasing member 540, seat 550, and a contact member 560.

The coil 510 receives an electrical signal output, and generates a magnetic field proportional to the electric signal. For example, the coil 510 can receive an electric signal from an engine control management computer (not shown) or an engine control unit (not shown), such that the coil 510 produces a magnetic field in proportion to the received electric signal. The electric signal received by the coil 510 can be a constant current driver, and can be a pulse-width-modulated signal. Preferably, the electric signal is a low-frequency pulse-width-modulated signal.

Preferably, as shown in the drawings, the electromagnetic coil 510 is disposed in the volume 210, proximate the outlet 230 of the housing 200.

The stator 520 includes a surface to create a gap with a surface of the armature 530. As shown in FIG. 1, the stator 520 can include a stator surface 527 to form this gap. The stator 520 can also include a support portion 525 for receiving an end of the biasing member 540. Preferably, as shown in the figure, the support portion 525 and the stator surface 527 are separate surfaces, and are parallel surfaces that are offset from one another along an axis of movement of the armature 530. However, the support portion 525 and the stator surface 527 can be a same surface, and can be different portions or areas of a same surface. However, as discussed above, one of ordinary skill will understand that the stator 520 can be any element that provides a surface to create a gap with the armature 530.

In the preferred arrangement, as shown in FIG. 1, the stator 520 is disposed in the volume 210 of the housing 200, and is disposed within the coil 510. The stator can be fabricated from a magnetic material, such that the armature 530 is magnetically attracted to the stator 520 when the coil 510 is energized.

The armature 530 provides a surface to create a gap with a surface of the stator 520, and is movably in response to an energization and deenergization of the coil 510. As shown in FIG. 1, the armature 530 can include an armature surface 537 to form this gap. The armature 530 can also include a support portion 535 to receiving an end of the biasing member 540. Preferably, as shown in FIG. 1, the support portion 535 and the armature surface 537 are different portions or areas of a same surface. However, it should be understood that the support portion 535 and the armature surface 537 can be separate surfaces, and can be parallel surfaces that are off-set from one another along an axis of movement of the armature 530. However, as discussed above, one of ordinary skill will understand that the armature 530 can be any element that provides a surface to create a gap with the stator 520 and is movable in response to energization and deenergization of the coil 510. The armature 530 can also include an inlet sealing surface 539 to prohibit flow through the inlet 220 when the armature 530 is in the closed position.

FIGS. 2 and 3 show examples of embodiments of the armature 530. As shown in FIG. 2, the armature 530 includes a magnetically operable portion 531 and an secondary portion 532. The magnetically operable portion 531 is magnetically operable by the coil valve 510. The magnetically operable portion 531 can be in the form of a sleeve. The secondary portion 532 can be a molded rubber insert. As shown in the figure, a void 533 for receipt of the member 560 can be formed in the armature surface 537 and can be formed in the secondary portion 532. Further, an area of an opposite end of the secondary portion 532 can be the inlet sealing surface 539 (an inlet contact member). As shown in FIG. 3, the magnetically operable portion 531 can be about cylindrical. The void 533 for receipt of the member 560 can be formed in the magnetically operable portion 531. Cooperating features on the magnetically operable portion 531 and the secondary portion 532 can be used to form a connection therebetween.

The biasing member 540 urges the armature 530 in a direction away from the stator 520 (i.e., to a closed position) to prohibit fluid flow through the valve 100. Preferably, as shown in the figures, the biasing member 540 is disposed between the support portions 525, 535, of the stator 220 and the armature 230, respectively.

Although the biasing member 540 is preferably a coil spring, as discussed above, it is to be understood by one of skill in the art that the biasing member 540 can be any element that urges the armature 530 or other portion of the valve assembly 500 to a closed position (i.e., to prohibit fluid flow through the valve 100.)

As shown in FIG. 1, the seat 550 can be disposed proximate the inlet 220 of the housing 200, and can be disposed in fluid communication with the inlet 220. In a preferred embodiment of the invention, as shown in the drawings, the seat 550 includes a seating surface 559 for achieving a fluid tight seal with the inlet sealing surface 539 of the armature 530 when in the closed position. A seat sealing member 556 is preferably used to seal seat 550 and the lower housing 244 and prohibit fluid flow therebetween.

During the opening and closing operations of the canister purge valve 100, the coil 510 produces a magnetic field in proportion to the strength of the received electrical signal. In a preferred embodiment, the magnetic field attracts the armature 530 towards the coil 510 and the stator 520 (i.e., in a direction that opposes the bias of the member 540). Thus, the inlet sealing surface 539 of the armature 530 can be moved away from the seat 560 so as to permit flow through the inlet 220 of the housing 200. As discussed above, the signal can be a constant current driver or a pulse-width-modulated signal, and preferably is a low-frequency pulse-width-modulated signal. In the case of the pulse-width-modulated signal, at an approximately zero percent duty cycle, the armature 530 is in the closed position. At a non-zero percent duty cycle, the armature 530 is open for a corresponding percentage of the frequency of the electric signal.

The compressible member 560 can provide a sufficient spring constant to overcome the magnetic attraction of the armature 530 in the direction of the coil 510 and the stator 520 while providing an increase in a flow rate through the system 100 for an increase in an energy power level. Thus, when the coil 510 receives a low-frequency pulse-width-modulated electric signal, the interaction among the armature 530, stator 520, and compressible member 560 allow for an increase in flow through the system 100 for an increase in duty cycle. In a preferred embodiment of the invention, the compressible member spans a gap of about approximately 0.5 mm to 2.0 mm, and provides a spring constant of at least the same as a spring constant of the biasing member 540. Preferably, the compressible member 560 is an elastomeric material. However, the compressible member 560 can be fabricated from rubbers, plastics, or metals so long as it provides the appropriate interaction among the armature 530, the stator 520, and the compressible member 560 to provide the increase in flow for an increase in energy power level and/or duty cycle.

In a preferred embodiment of the invention, and as shown in FIG. 1, the member 560 maintains continuous contact between the stator 520 and the armature 530 during an entire opening and closing of the actuator valve 500 (movement of the armature 530 between the open position and the closed position).

Figure 4:
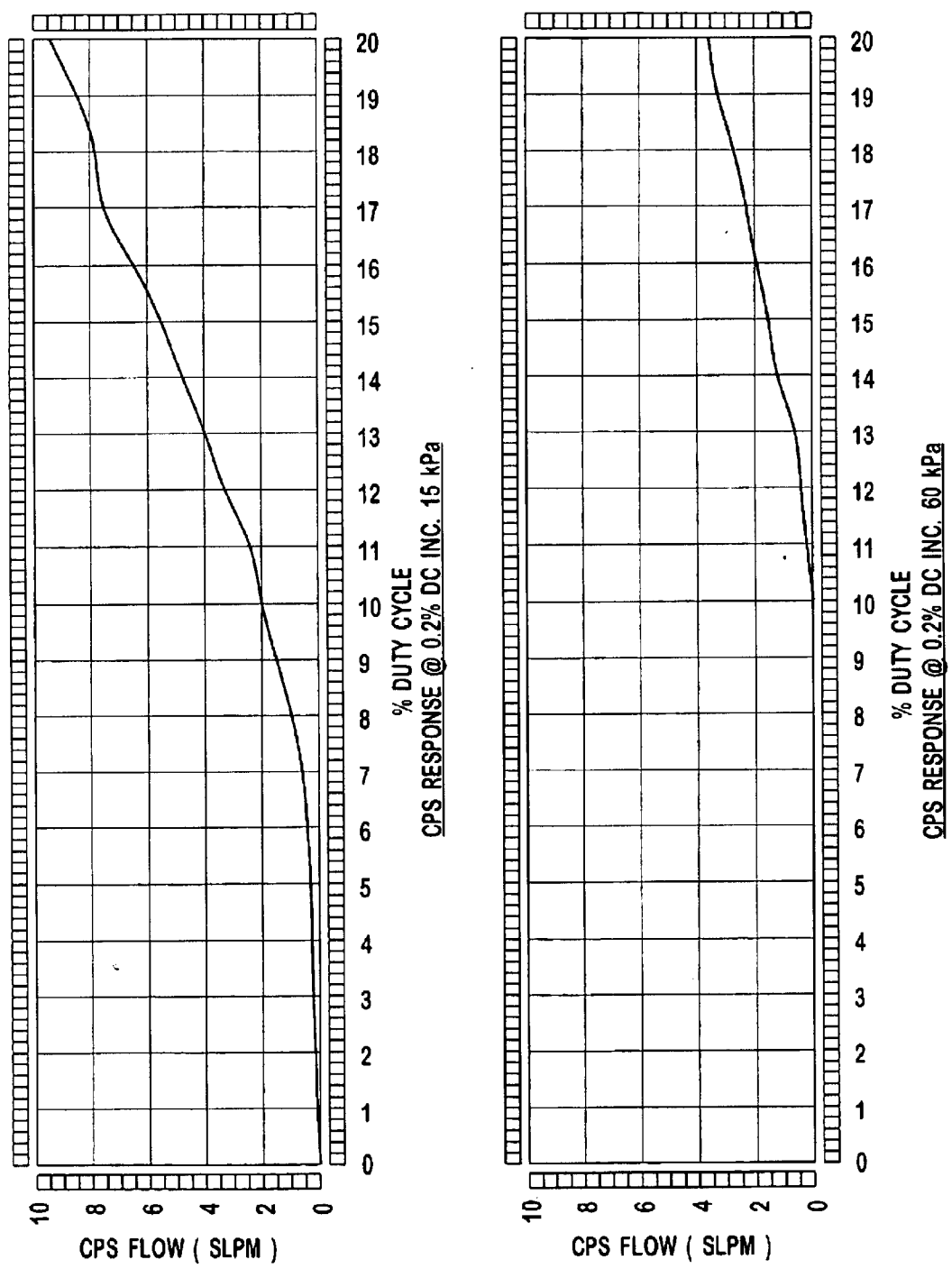
FIG. 4 shows a graph illustrating flow rates as a function of percent duty cycle for various load levels in the canister purge valve design including a contact member.

FIG. 4 shows examples of flow rates through a canister purge valve including a contact member as a function of percent duty cycle at load levels of 15 kPa and 60 kPa. For every increase in percent duty cycle (i.e., for every increase in energy level), a flow rate through the valve increase. By way of example, at an load level of 15 kPa, for an increase in duty cycle from about 7.6% to about 8.0%, the flow rate increases about 0.2 slpm.

Figure 5:
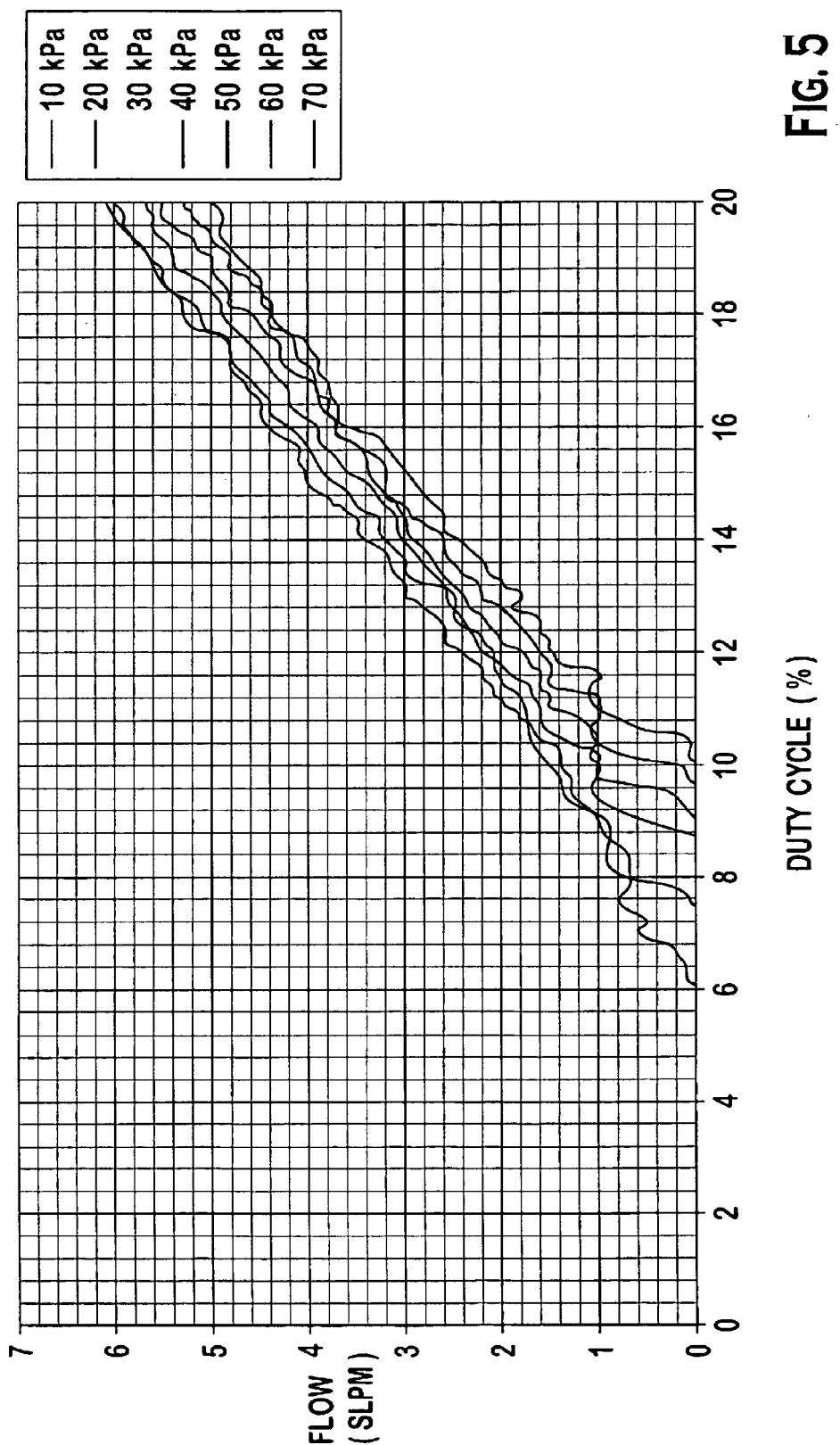
FIG. 5 shows a graph illustrating flow rates as a function of percent duty cycle for various load levels in a known canister purge valve design.

FIG. 5 shows examples of flow rates through a valve that is similar to the valve illustrated in the figures including a biasing member. However, the similar valve does not have a member in continuous contact with the stator and the armature. The flow rates are shown as a function of percent duty cycle for load levels of 10 kPa, 20 kPa, 30 kPa, 40 kPa, 50 kPa, 60 kPa, and 70 kPa. As illustrated, at each load level, there are numerous increases in percent duty cycle that result in decreased flow rates through the similar valve. By way of comparative example, at a load level of 10 kPa, for an increase in duty cycle from about 7.6% to about 8.0%, the flow rate through the similar valve decreases about 0.1 slpm.

Thus, a comparison of FIGS. 4 and 5 indicates that while fluid flow rates through the similar valve drop for numerous increases in duty cycle (i.e., increase in power to the coil), and while fluid flow rates through the similar valve increase non-linearly for numerous increases in duty cycle, fluid flow rates through the valve including the member increase for corresponding increases in duty cycle (that is, fluid flow rates do not decrease for any increase in duty cycle), and fluid flow rates through the valve including the member increase linearly for increases in duty cycle.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof

What is claimed is:

1. A valve, comprising:
   a housing defining a volume and having an inlet and an outlet in fluid communication with the volume;
   a coil disposed in the volume proximate the outlet;
   a stator disposed in the volume proximate the outlet, the stator having a first surface;
   an armature disposed in the coil, the armature having a second surface proximate the first surface of the stator and defining a gap therebetween, the armature movable to an open position permitting fluid flow through the volume in response to an energization of the coil;
   a biasing member disposed between the stator and the armature, the biasing member urging the armature to a closed position prohibiting fluid flow through the volume; and
   an elastomeric contact member disposed in the gap and maintaining continuous contact with the first and second surfaces during an entire movement of the armature between the open and closed positions.

2. The valve according to claim 1, wherein the biasing member comprises a coil spring.

3. The valve according to claim 2, wherein the spring engages a face of the armature.

4. The valve according to claim 3, wherein the face of the armature engaged by the spring comprises the second surface of the armature.

5. The valve according to claim 4, wherein the spring engages a support portion of the stator.

6. The valve according to claim 5, wherein the support portion of the stator comprises a surface separate from the first surface of the stator.

7. The valve according to claim 1, further comprising:
   a seat in fluid communication with the inlet.

8. The valve according to claim 7, wherein the armature further includes an inlet surface adapted to prohibit fluid flow through the seat when the armature is in the closed position.

9. The valve according to claim 8, wherein the inlet surface of the armature comprises a molded rubber insert.

10. The valve according to claim 1, wherein the housing comprises an upper housing, a lower housing, and a housing sealing member disposed between the upper and lower housing.

11. The valve according to claim 10, further comprising:
    a seat in fluid communication with the inlet; and
    a seat sealing member disposed between the seat and the lower housing to prohibit fluid flow therebetween.

12. The valve according to claim 11, wherein the housing further comprises a weld between the upper and lower housing.

13. A method of maintaining an increase in flow rate for an increase in duty cycle in a system having a housing defining a volume, the system having a coil, a stator, and an armature disposed in the volume, comprising:
    energizing the coil to attract the armature towards the stator; and
    maintaining continuous contact between the armature and the stator with an elastomeric compressible member during energization and deenergization of the coil.

14. The method according to claim 13, wherein the maintaining further comprises maintaining continuous contact between the armature and the stator with the compressible member during energization and deenergization of the coil to provide an increase in a flow rate through the volume.

15. The method according to claim 13, wherein the maintaining further comprises maintaining continuous contact between the armature and the stator with the compressible member during energization and deenergization of the coil to provide a linear increase in a flow rate through the volume.

16. The method according to claim 13, further comprising:
    maintaining an increase in a flow rate through the volume for an increased power level to the coil.

17. A method of maintaining an increase in flow rate for an increase in duty cycle in a system having a housing defining a volume, the system having a coil, a stator, and an armature disposed in the volume, comprising:
    energizing the coil to attract the armature towards the stator;
    maintaining continuous contact between the armature and the stator with a compressible member during energization and deenergization of the coil; and
    disposing a biasing member between the armature and the stator, the biasing member urging the armature away from the stator.

18. A method of maintaining an increase in flow rate through a valve defining a void, the valve including a coil, a stator, and an armature disposed in the void, comprising:
    energizing the coil to attract the armature towards the stator and permit flow through the valve; and
    deforming an elastomeric compressible member between the armature and the stator to provide an increase in a flow rate through the valve.

19. The method according to claim 18, wherein the deforming comprises deforming the compressible member between the armature and the stator to provide a linear increase in the flow rate through the valve.

20. The method according to claim 19, wherein the deforming comprises deforming the compressible member between the armature and the stator to provide the increase in the flow rate through the valve for an increased power level to the coil.

21. A method of maintaining an increase in flow rate through a valve defining a void, the valve including a coil, a stator, and an armature disposed in the void, comprising:
    energizing the coil to attract the armature towards the stator and permit flow through the valve;
    deforming a compressible member between the armature and the stator to provide an increase in a flow rate through the valve; and
    disposing a biasing member between the armature and the stator, the biasing member urging the armature away from the stator.

* * * * *